(12) United States Patent
Tamaki et al.

(10) Patent No.: US 9,595,286 B2
(45) Date of Patent: Mar. 14, 2017

(54) GLASS SUBSTRATE FOR MAGNETIC DISK AND MAGNETIC DISK

(71) Applicant: HOYA CORPORATION, Tokyo (JP)

(72) Inventors: Masanori Tamaki, Higashimurayama (JP); Takeyoshi Takahashi, Akishima (JP); Masaaki Ueda, Yokohama (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/770,025

(22) PCT Filed: Feb. 28, 2014

(86) PCT No.: PCT/JP2014/055114
§ 371 (c)(1),
(2) Date: Aug. 24, 2015

(87) PCT Pub. No.: WO2014/133148
PCT Pub. Date: Sep. 4, 2014

(65) Prior Publication Data
US 2016/0005431 A1    Jan. 7, 2016

(30) Foreign Application Priority Data
Mar. 1, 2013 (JP) .................. 2013-041303

(51) Int. Cl.
G11B 5/73 (2006.01)
G11B 5/82 (2006.01)

(52) U.S. Cl.
CPC .................. G11B 5/82 (2013.01); G11B 5/73 (2013.01); G11B 5/7315 (2013.01)

(58) Field of Classification Search
None
See application file for complete search history.

(56) References Cited

U.S. PATENT DOCUMENTS

2003/0172677 A1*  9/2003  Miyamoto ............ C03C 21/002
                                             65/30.14
2007/0009812 A1*  1/2007  Ito ......................... B82Y 10/00
                                             430/5
(Continued)

FOREIGN PATENT DOCUMENTS

JP    2004-079009 A    3/2004
JP    2008-217918 A    9/2008
(Continued)

OTHER PUBLICATIONS

International Search Report in PCT/JP2014/055114 dated May 27, 2014.

*Primary Examiner* — Kevin Bernatz
(74) *Attorney, Agent, or Firm* — Global IP Counselors, LLP

(57) ABSTRACT

A magnetic-disk glass substrate has a circular center hole, a pair of main surfaces and an edge surface. The edge surface has a side wall surface and chamfered surfaces interposed between the side wall surface and the main surfaces, and a roundness of an edge surface on an outer circumferential side is 1.5 μm or less. Also, a midpoint A between centers of two least square circle respectively derived from outlines in a circumferential direction respectively obtained at two positions spaced apart by 200 μm in a substrate thickness direction on the side wall surface on the outer circumferential side, and centers B and C respectively derived from a respective one of two chamfered surfaces on the outer circumferential side in the substrate thickness direction, are located such that a sum of respective distances between A and B, and A and C, is 1 μm or less.

20 Claims, 5 Drawing Sheets

(56) References Cited

U.S. PATENT DOCUMENTS

| 2015/0262604 A1* | 9/2015 | Takahashi | G11B 5/73 |
| | | | 428/846.9 |
| 2015/0332722 A1* | 11/2015 | Tamaki | G11B 5/7315 |
| | | | 428/827 |
| 2015/0371673 A1* | 12/2015 | Tamaki | G11B 5/82 |
| | | | 428/836 |
| 2016/0280590 A1* | 9/2016 | Kashima | B24B 9/00 |

FOREIGN PATENT DOCUMENTS

| JP | 2008-310842 A | 12/2008 |
| JP | 2011-198429 A | 10/2011 |

* cited by examiner

X-X ENLARGED CROSS-SECTION

GLASS SUBSTRATE FOR MAGNETIC DISK AND MAGNETIC DISK

CROSS-REFERENCE TO RELATED APPLICATIONS

This U.S. National stage application of International Patent Application No. PCT/JP2014/055114, filed on Feb. 28, 2014, which, in turn, claims priority under 35 U.S.C. §119(a) to Japanese Patent Application No. 2013-041303, filed in Japan on Mar. 1, 2013, the entire contents of which are hereby incorporated herein by reference.

BACKGROUND

Field of the Invention

The present invention relates to a magnetic-disk glass substrate and a magnetic disk.

Background Art

Nowadays, personal computers, digital versatile disc (DVD) recorders, and the like have a built-in hard disk drive (HDD) for data recording. In particular, in a hard disk drive that is used in a device premised on portability such as a notebook-type personal computer, a magnetic disk in which a magnetic layer is provided on a glass substrate is used and magnetic recording information is recorded to or read from the magnetic layer with a magnetic head that flies slightly above the surface of the magnetic disk. A glass substrate is unlikely to be plastically deformed compared with a metal substrate (aluminum substrate) or the like, and thus is preferably used as the substrate of this magnetic disk.

Moreover, the density of magnetic recording has been increased to meet the demand for an increase in the storage capacity of hard disk drives. For example, the magnetic recording information area has been made smaller using a perpendicular magnetic recording system that causes the direction of magnetization in the magnetic layer to be perpendicular to the surface of the substrate. This makes it possible to increase the storage capacity per disk substrate. In such a disk substrate, it is preferable that the substrate surface is made as flat as possible and the direction in which magnetic particles grow is arranged in the vertical direction such that the direction of magnetization in the magnetic layer faces in a substantially perpendicular direction relative to the substrate surface.

Also, in order to further increase the storage capacity, by using a magnetic head equipped with a dynamic flying height (DFH) mechanism to make the flying height of the magnetic head from the magnetic recording surface extremely short, the magnetic spacing between the recording and reproducing element of the magnetic head and the magnetic recording layer of the magnetic disk is reduced, thus further improving the accuracy of the recording and reproduction of information (improving the S/N ratio). Also in this case, it is required to make the surface unevenness of a magnetic-disk substrate as small as possible in order for the magnetic head to stably read/write magnetic recording information over a long period of time.

Servo information that is used to position the magnetic head at a data track is recorded on the magnetic disk. It is conventionally known that when the roundness of an edge surface of the magnetic disk on the outer circumferential side (also referred to as "outer circumferential edge surface" hereinafter) is reduced, the magnetic head flies stably, and thus the servo information is favorably read, and the magnetic head stably reads/writes information. For example, the technique described in JP 2008-217918A discloses a magnetic-disk glass substrate in which the roundness of the outer circumferential edge surface is 4 µm or less. With this glass substrate, the durability against load/unload (LUL) testing is improved by reducing the roundness of the outer circumferential edge surface.

SUMMARY

Incidentally, in recent years, HDDs using a shingle write system in which recording is performed such that adjacent tracks partially overlap with each other are known. With the shingle write system, signal deterioration caused by recording to an adjacent track is extremely small, thus making it possible to dramatically increase the track recording density and to achieve an extremely high track recording density of 500 kTPI (tracks per inch) or more, for example. On the other hand, due to the increase in TPI, the tracking performance of the magnetic head for servo signals is more rigorously required than before.

In a HDD having a track recording density of 500 kTPI or more using the shingle write system, for example, a phenomenon where the servo signals was unstably read occurred at the edge portion of the magnetic disk on the outer circumferential side even when the roundness of the outer circumferential edge surface of the magnetic disk was reduced to 1.5 µm or less. It is conceivable that this phenomenon is caused by stable reading being affected by the magnetic disk vibrating (referred to as fluttering) due to disturbance of air flow on the outermost circumferential side of the outer circumferential side edge portion of the magnetic disk. The outer circumferential side edge portion of a main surface of the magnetic disk is more likely to be influenced by flutter compared to a region more on the inner circumferential side, and thus it is difficult to perform reading stably.

An object of the present invention is to provide a magnetic-disk glass substrate and a magnetic disk that are capable of suppressing disturbance of air flow near the outer circumferential side edge portion of the magnetic disk and suppressing flutter.

In order to suppress disturbance of air flow near the outer circumferential side edge portion of a magnetic disk and to eliminate influences resulting from clamping the magnetic disk, the inventor assembled a HDD by eliminating play (a gap between the inner hole of the magnetic disk and a spindle) to precisely align the center of the magnetic disk with the center of the spindle. Accordingly, wobble of the outer circumferential edge surface of the magnetic disk in the disk radial direction was made less than or equal to the roundness of the outer circumferential edge surface such that the influence of the roundness of the edge surface of the magnetic disk on the inner circumferential side, and the influence of the concentricity of the inner circumferential edge surface and the outer circumferential edge surface were eliminated, but flutter was not reduced.

It was conventionally thought that flutter is suppressed when the roundness of the magnetic disk is reduced, and that roundness and flutter are correlated. However, according to studies conducted by the inventor of the present invention, flutter was not suppressed even when the roundness was reduced to 1.5 µm or less, and it was revealed that in a case where the roundness was extremely small, roundness and flutter were not correlated.

It was thought that the reason for this was as follows. That is, the roundness of the outer circumferential edge portion has been conventionally measured by positioning a plate-shaped probe that is longer than the thickness of a glass substrate vertically with respect to the main surface of the glass substrate and bringing the probe into contact with the outer circumferential edge portion. At this time, the probe is in contact with a position of the substrate that projects most outwardly in the substrate thickness direction. Accordingly, the shape of the substrate that projects most outwardly is reflected to the outline of the outer circumferential edge portion that serves as a basis of the roundness measurement, irrespective of the shape of the outer circumferential edge portion in the substrate thickness direction. Therefore, with the conventional method for measuring roundness, the three-dimensional shape of the side wall surface of the outer circumferential edge portion in the substrate thickness direction was not reflected. In the case where the outer circumferential edge portion of the magnetic disk was provided with sufficiently favorable roundness based on the conventional method for measuring the roundness, it was thought that the influence that factors other than roundness exerted on flutter was relatively increased, and thus that the correlation between roundness and flutter was no longer evident.

In view of this, the inventor of the present invention focused attention on the shape of the magnetic disk in the substrate thickness direction in addition to parameters of the magnetic disk in a direction parallel to the main surface of the magnetic disk such as roundness, and first studied variation in substrate thickness at the outer circumferential side edge portion of the magnetic disk, but the variation was extremely small, and no problems could be found. In view of this, it was revealed that the inclination and unevenness of a side wall surface (a surface extending in a direction orthogonal to the main surface) of the outer circumferential edge surface of the magnetic disk or chamfered surfaces (surfaces interposed between the side wall surface and the main surfaces) affected flutter in the outermost circumferential portion of the magnetic disk. That is, it was revealed that by making the roundness of the outer circumferential edge surface of the magnetic disk extremely small, the shape of the outer circumferential edge surface in the substrate thickness direction affected flutter.

As a result of further studies, it was found that a distance between the central axis of the side wall surface of the magnetic disk on the outer circumferential side and the center of the two chamfered surfaces greatly influenced flutter. In other words, it was found that if this distance is large, flutter is likely to increase. In the case where the magnetic disk is viewed as a structure having a first cylinder having one axis, and second and third cylinders of smaller diameter that are located on both sides in the axis direction, it can be thought that this distance corresponds to the size of the displacement of the axes of these three cylinders. It is thought that flutter changes due to a change in eccentricity resulting from this axis displacement.

A magnetic-disk glass substrate of the present invention is a magnetic-disk glass substrate having a circular hole at a center, and including a pair of main surfaces and an edge surface, the edge surface having a side wall surface and chamfered surfaces interposed between the side wall surface and the main surfaces, a roundness of the edge surface on an outer circumferential side being 1.5 μm or less, and when outlines in a circumferential direction are respectively obtained at two positions spaced apart by 200 μm in a substrate thickness direction on the side wall surface on the outer circumferential side, and a midpoint between centers of two least square circles respectively derived from the outlines is given as a midpoint A, and when outlines in the circumferential direction are respectively obtained at positions that are located at centers of the two chamfered surfaces on the outer circumferential side in the substrate thickness direction, and among centers of least square circles derived from the outlines, a center derived from one chamfered surface is given as a center B, and a center derived from the other chamfered surface is given as a center C, a sum of a distance between the midpoint A and the center B and a distance between the midpoint A and the center C being 1 μm or less.

In the magnetic-disk glass substrate of the present invention, preferably the sum is 0.5 μm or less.

In the magnetic-disk glass substrate of the present invention, in a case where, with regard to a surface roughness of the side wall surface on the outer circumferential side, a maximum height in the substrate thickness direction is Rz(t) and a maximum height in the circumferential direction is Rz(c), preferably Rz(t)/Rz(c) is 1.2 or less.

In the magnetic-disk glass substrate of the present invention, when a measurement point is provided every 30 degrees in the circumferential direction, referenced on the center of the glass substrate, and a radius of curvature of a shape of a portion between the side wall surface and the chamfered surface on the outer circumferential side at the measurement point is derived, preferably a difference in the radius of curvature between adjacent measurement points is 0.01 mm or less.

In the magnetic-disk glass substrate of the present invention, preferably outlines of the side wall surface in the circumferential direction are respectively obtained at a plurality of different positions in the substrate thickness direction, including at least three positions spaced apart by 100 μm in the substrate thickness direction on the side wall surface on the outer circumferential side, an inscribed circle and a circumscribed circle of each outline are obtained, and a difference in the radius between a smallest inscribed circle and a largest circumscribed circle is 5 μm or less.

The magnetic-disk glass substrate of the present invention is preferably used in a case where a substrate thickness is 0.5 mm or less.

A magnetic disk of the present invention is a magnetic disk in which a magnetic layer is formed on the magnetic-disk glass substrate.

DESCRIPTION OF EMBODIMENTS

Figure 1A:
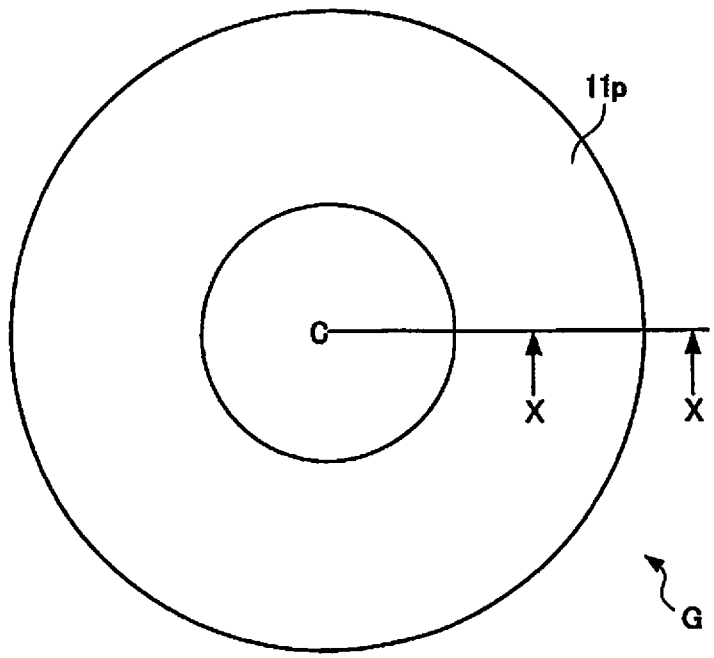
FIG. 1A is a plan view of a magnetic-disk glass substrate of an embodiment.

Hereinafter, a magnetic-disk glass substrate of this embodiment will be described in detail.

[Magnetic-Disk Glass Substrate]

Aluminosilicate glass, soda-lime glass, borosilicate glass, or the like can be used as a material for a magnetic-disk glass substrate of this embodiment. In particular, aluminosilicate glass can be preferably used because it can be chemically strengthened and be used to produce a magnetic-disk glass substrate having excellent flatness of its main surfaces and excellent strength of the substrate. Amorphous aluminosilicate glass is preferable since smoothness of the surface, such as roughness, can be improved.

Although there is no limitation on the composition of the magnetic-disk glass substrate of this embodiment, the glass substrate of this embodiment is preferably amorphous aluminosilicate glass having a composition including, in terms of oxide amount in mol %, $SiO_2$ in an amount of 50 to 75%, $Al_2O_3$ in an amount of 1 to 15%, at least one component selected from $Li_2O$, $Na_2O$, and $K_2O$ in a total amount of 5 to 35%, at least one component selected from MgO, CaO, SrO, BaO, and ZnO in a total amount of 0 to 20%, and at least one component selected from $ZrO_2$, $TiO_2$, $La_2O_3$, $Y_2O_3$, $Ta_2O_5$, $Nb_2O_5$, and $HfO_2$ in a total amount of 0 to 10%.

The glass substrate of this embodiment may be preferably amorphous aluminosilicate glass having a composition including, in mass %, $SiO_2$ in an amount of 57 to 75%, $Al_2O_3$ in an amount of 5 to 20% (it should be noted that the total amount of $SiO_2$ and $Al_2O_3$ is 74% or more), $ZrO_2$, $HfO_2$, $Nb_2O_5$, $Ta_2O_5$, $La_2O_3$, $Y_2O_3$, and $TiO_2$ in a total amount of more than 0% to 6% or less, $Li_2O$ in an amount of more than 1% to 9% or less, $Na_2O$ in an amount of 5 to 28% (it should be noted that a mass ratio $Li_2O/Na_2O$ is 0.5 or less), $K_2O$ in an amount of 0 to 6%, MgO in an amount of 0 to 4%, CaO in an amount of more than 0% to 5% or less (it should be noted that the total amount of MgO and CaO is 5% or less and the content of CaO is larger than that of MgO), and SrO+BaO in an amount of 0 to 3%, for example.

The glass substrate of this embodiment may also be crystallized glass containing, in terms of oxide amount in mass %, $SiO_2$ in an amount of 45.60 to 60%, $Al_2O_3$ in an amount of 7 to 20%, $B_2O_3$ in an amount of 1.00 to less than 8%, $P_2O_5$ in an amount of 0.50 to 7%, $TiO_2$ in an amount of 1 to 15%, and RO (it should be noted that R represents Zn and Mg) in a total amount of 5 to 35%, CaO in an amount of 3.00% or less, BaO in an amount of 4% or less, no PbO component, no $As_2O_3$ component, no $Sb_2O_3$ component, no $Cl^-$ component, no $NO^-$ component, no $SO^{2-}$ component, no $F^-$ component, and one or more selected from $RAl_2O_4$ and $R_2TiO_4$ (it should be noted that R represents one or more selected from Zn and Mg) as a main crystal phase, in which the particle size of crystals in the main crystal phase is in a range of 0.5 nm to 20 nm, the degree of crystallization is 15% or less, and the specific gravity is 2.95 or less, for example.

The composition of the magnetic-disk glass substrate of this embodiment may include $SiO_2$, $Li_2O$ and $Na_2O$, and one or more alkaline earth metal oxides selected from the group consisting of MgO, CaO, SrO and BaO as essential components, the molar ratio of the content of CaO to the total content of MgO, CaO, SrO, and BaO (CaO/(MgO+CaO+SrO+BaO)) may be 0.20 or less, and the glass-transition temperature may be 650° C. or higher. The magnetic-disk glass substrate having such a composition is preferable for a magnetic-disk glass substrate to be used in a magnetic disk for energy-assisted magnetic recording.

The magnetic-disk glass substrate of this embodiment is a thin annular glass substrate. Although there is no limitation on the size of the magnetic-disk glass substrate, the magnetic-disk glass substrate is preferable as a magnetic-disk glass substrate having a nominal diameter of 2.5 inches or 3.5 inches, for example. It should be noted that the thickness (0.635 mm, 0.8 mm, 1 mm, 1.27 mm, or the like) of the magnetic-disk glass substrate referred to in the description below is a nominal value and actual measurement values may be slightly larger or smaller than the nominal values.

Figure 1B:
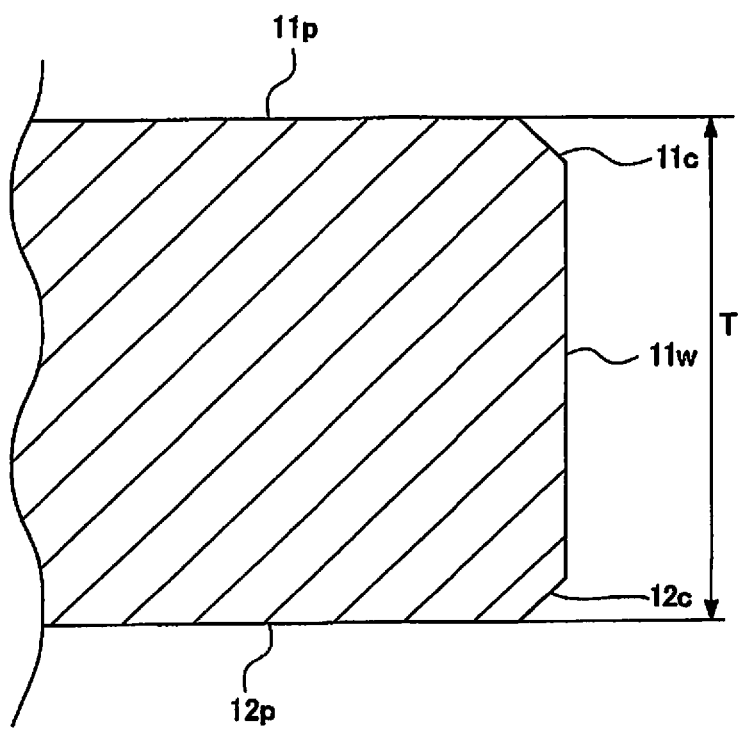
FIG. 1B is a cross-sectional view in a substrate thickness direction of the magnetic-disk glass substrate of the embodiment.

FIGS. 1A and 1B show a magnetic-disk glass substrate G of this embodiment. FIG. 1A is a plan view of the magnetic-disk glass substrate G and FIG. 1B is a cross-sectional view of the magnetic-disk glass substrate G in the substrate thickness direction.

The magnetic-disk glass substrate G (also referred to as "glass substrate G" as appropriate hereinafter) has a circular hole in the center, a pair of main surfaces 11p and 12p, and an edge surface. The edge surface has a side wall surface 11w, and chamfered surfaces 11c and 12c interposed between the side wall surface 11w and the main surfaces 11p and 12p.

In the magnetic-disk glass substrate G of this embodiment, the outer circumferential edge surface has a roundness of 1.5 μm or less and a shape evaluation value (described later) of 1 μm or less.

The method for measuring roundness can be a known method. For example, as described above, a plate-shaped probe that is longer than the thickness of the glass substrate is arranged vertically with respect to the main surface of the glass substrate so as to be opposed to the outer circumferential edge surface, an outline is obtained by rotating the glass substrate in the circumferential direction, and thus a difference in the radius between an inscribed circle and a circumscribed circle of this outline can be calculated as the roundness of the glass substrate. It should be noted that a roundness/cylindrical shape measurement device can be used to measure roundness, for example.

Figure 2:
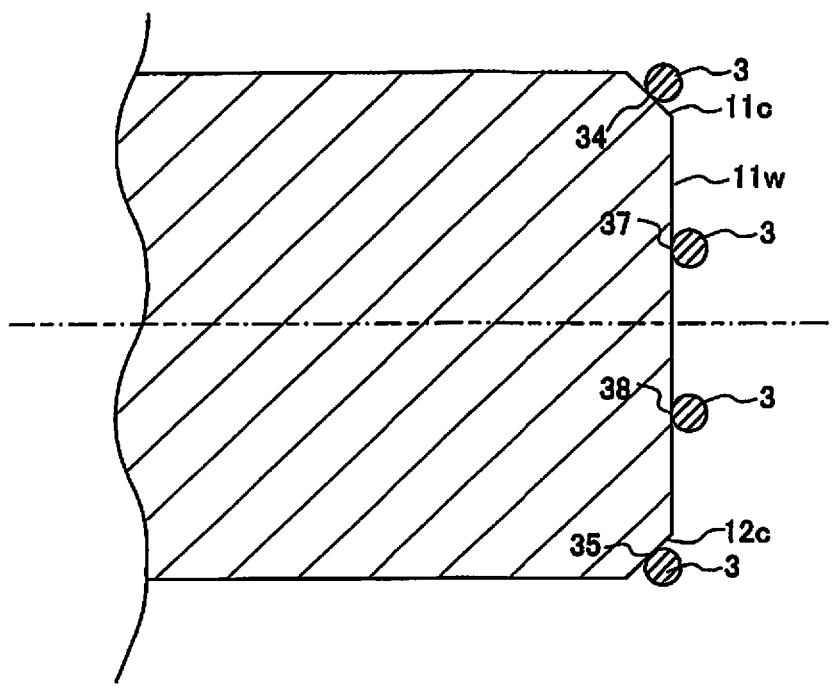
FIG. 2 is a diagram illustrating a method for measuring a shape evaluation value of an outer circumferential edge surface of the magnetic-disk glass substrate of the embodiment.
Figure 3:
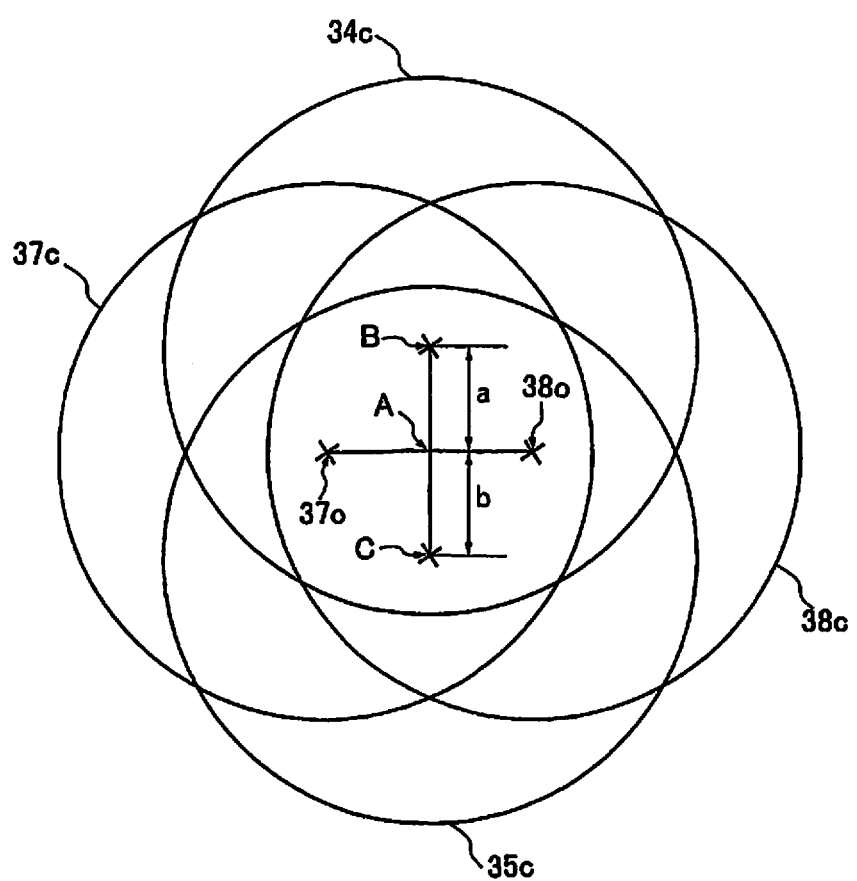
FIG. 3 is a diagram illustrating a method for measuring the shape evaluation value of the outer circumferential edge surface of the magnetic-disk glass substrate of the embodiment.

The shape evaluation value of the glass substrate G will be described with reference to FIGS. 2 and 3. FIGS. 2 and 3 are diagrams illustrating a method for measuring the shape evaluation value of the outer circumferential edge surface of the magnetic-disk glass substrate G of this embodiment. FIG. 2 shows the cross-section of the outer circumferential edge surface of the glass substrate G in the substrate thickness direction. There is no particular limitation on the inclination angle of the side wall surface 11w, and the inclination angle is 40 degrees to 70 degrees, for example. In addition, the boundaries between the side wall surface 11w and the chamfered surfaces 11c and 12c are not limited to a shape having an edge as shown in the diagram, and may have a smoothly continuous curved shape.

Outlines in the circumferential direction are respectively obtained at two positions 37 and 38 spaced apart by 200 μm in the substrate thickness direction on the side wall surface 11w, and the midpoint between centers 37o and 38o of two least square circles 37c and 38c that are respectively derived from these outlines is given as a "midpoint A". Furthermore, outlines in the circumferential direction are respectively obtained at positions 34 and 35 that are located at centers of the two chamfered surfaces 11c and 12c in the substrate thickness direction, and among centers 34o and 35o of least square circles 34c and 35c that are respectively derived from these outlines, one center 34o derived from the chamfered surface 11c is given as a "center B", and the other center 35o derived from the chamfered surface 12c is given as a "center C". In this case, the shape evaluation value is the sum of a distance a between the midpoint A and the center B and a distance b between the midpoint A and the center C. The shape evaluation value of the glass substrate G is preferably 1.0 μm or less, and more preferably 0.5 μm or less.

The two positions 37 and 38 on the side wall surface 11w are positions that are respectively spaced apart by 100 μm from the central position of the glass substrate G in the substrate thickness direction toward the main surface 11p side and the main surface 12p side, for example. The measurement positions 34 and 35 for obtaining the outlines of the chamfered surfaces 11c and 12c are positions that are respectively closer to the central position side in the substrate thickness direction by an equal distance from the main surfaces 11p and 12p, for example (positions that are respectively closer to the central position by 0.075 mm from the main surfaces 11p and 12p of the glass substrate G in a case where the chamfered surfaces of the glass substrate G have a length of 0.15 mm in the substrate thickness direction, for example).

As a measurement device for measuring the shapes of the outer circumferential edge surface at the measurement positions 37, 38, 34 and 35, the roundness/cylindrical shape measurement device can be used, for example. A stylus 3 of the roundness/cylindrical shape measurement device can move in micron units in the vertical direction (substrate thickness direction).

It should be noted that the thickness of the glass substrate G is measured in advance with a micrometer prior to the measurement. Moreover, an outline shape measurement device is used to measure the shape, the length in the substrate thickness direction, the length in the radial direction, and the inclination angle with respect to the main surface of the chamfered surface in a cross-section in the radial direction, and in addition, the length of the side wall surface in advance. The position of the boundary between the chamfered surface and the side wall surface can be determined as an intersection point of an extension line of the side wall surface and an extension line of the chamfered surface in the case where both the side wall surface and the chamfered surface have a linear outline. In the case where the chamfered surface and the side wall surface have an arc outline, each outline is approximated by a circle that best overlaps the outline, and the position of the boundary can be determined as an intersection point of the derived circles. In the case where the outline of the chamfered surface or the side wall surface has both a linear portion and an arc portion, it is sufficient that the position of the boundary is determined by combining the above-described methods as appropriate.

At the time of measurement, the glass substrate G is set in the roundness/cylindrical shape measurement device such that the main surface of the glass substrate G is horizontal with respect to a reference plane of the measurement device, and in addition, the center of the glass substrate G coincides with a rotation center of the measurement device. The height of a point at the front end of the stylus 3 that comes into contact with the glass substrate G in the measurement is matched with the height of the upper main surface of the glass substrate G that has been set in the measurement device. When the stylus 3 is lowered by a half distance of the substrate thickness in the substrate thickness direction in this state, the stylus 3 is disposed at a height of the center of the glass substrate G in the substrate thickness direction. Then, outlines of the outer circumferential edge portion of the glass substrate G are measured at the point 37 to which the stylus 3 is raised by 100 μm from the center of the substrate thickness and the point 38 to which the stylus 3 is lowered by 100 μm from the center of the substrate thickness. The centers 37o and 38o of the two least square circles 37c and 38c of the side wall surface 11w are determined from these outlines, and in addition, the midpoint A between the two centers 37o and 38o is determined.

In addition, the position of the stylus 3 is set to an intermediate height of each of the two chamfered surfaces in the substrate thickness direction, and outlines of the outer circumferential edge portion of the glass substrate G are measured at the positions 34 and 35. The centers B and C of the least square circles 34c and 35c of the chamfered surfaces 11c and 12c are determined based on these outlines. Next, the distance a between the midpoint A and the center B, and the distance b between the midpoint A and the center C are summed, and thus the shape evaluation value is derived.

It should be noted that in a structure that has the above-described three cylinders having different diameters, it is conceivable that the positions 34 and 35, which are respectively at intermediate heights of the chamfered surfaces in the substrate thickness direction, are points that best express the degree of eccentricity of the cylinders corresponding to the chamfered surfaces. In addition, it is thought that these positions are points that most affect air flows near the chamfered surfaces. For these reasons, it is preferable to measure the outlines at these positions.

The shape evaluation value derived from the side wall surface 11w and the chamfered surfaces 11c and 12c is adjusted by chamfering processing with a formed grindstone, edge surface grinding processing, and brushing, which will be described later, for example.

In the glass substrate G of this embodiment, it is preferable that the side wall surface 11w has a cylindricity of 5 μm or less. By setting the cylindricity of the side wall surface 11w to 5 μm or less, air flow between the inner wall of the HDD and the side wall surface is unlikely to be disturbed and flutter is further suppressed, leading to a reduction in the number of servo errors.

Figure 4:
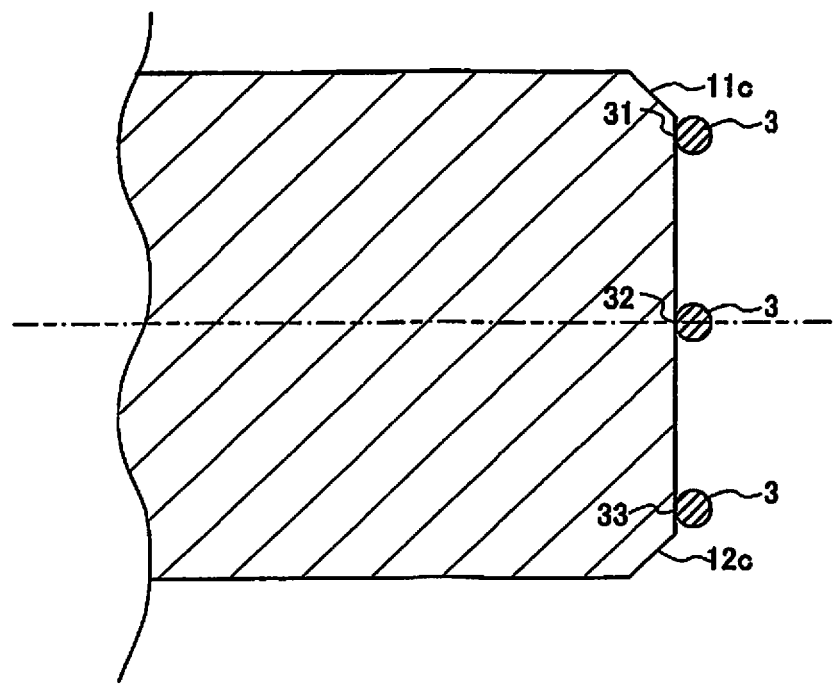
FIG. 4 is a diagram illustrating a method for measuring a cylindricity of a side wall surface of the magnetic-disk glass substrate of the embodiment.
Figure 5:
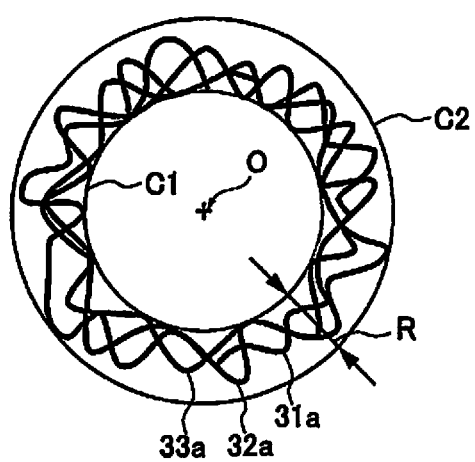
FIG. 5 is a diagram illustrating a method for measuring the cylindricity of the side wall surface of the magnetic-disk glass substrate of the embodiment.

The cylindricity of the glass substrate G will be described with reference to FIGS. 4 and 5. FIGS. 4 and 5 are diagrams illustrating a method for measuring the cylindricity of the side wall surface on the outer circumferential side of the magnetic-disk glass substrate G of this embodiment. Outlines 31a, 32a, and 33a of the side wall surface 11w in the circumferential direction are respectively obtained at a plurality of different positions in the substrate thickness direction including at least three positions 31, 32, and 33 spaced apart by 100 μm in the substrate thickness direction on the side wall surface 11w, and inscribed circles and circumscribed circles of the respective outlines are obtained, with "cylindricity" referring to a difference R between the radius of a smallest inscribed circle C1 and the radius of a largest inscribed circle C2. It should be noted that it can be said that the closer to zero such an evaluation index, that is, the radius difference R, is, the closer to a geometric cylinder the shape of the outer circumferential edge surface is, and therefore, the evaluation index is referred to as "cylindricity" in this description. FIG. 5 is a diagram illustrating a method for measuring the cylindricity of an outer circumferential edge surface of the glass substrate G.

There are three measurement positions on the side wall surface 11w in this embodiment. Among the three measurement positions 31, 32, and 33, the measurement position 32 is the central position of the glass substrate G in the substrate thickness direction, for example. The measurement positions 31 and 33 are spaced apart from the measurement position 32 by 100 μm in the substrate thickness direction, for example. It should be noted that the measurement positions 31 and 32 are provided at positions spaced apart from the measurement position 32 by 100 μm in the substrate thickness direction in the case where the magnetic-disk glass substrate has a substrate thickness of 0.635 mm. In the case where the substrate thickness is different, the distance from the measurement position 32 to the measurement positions 31 and 32 respectively in the substrate thickness direction may be changed. For example, in the case of a magnetic-disk glass substrate having a substrate thickness of T (mm), the distance may be set to 100 (μm)×(L/0.635).

As a measurement device for measuring the shapes of the outer circumferential edge surface of the glass substrate G at the measurement positions 31 to 33, a device is used that can obtain outlines 31a, 32a and 33a distinctly from each other at the measurement positions 31 to 33 of the side wall surface 11w. From this point, it is preferable that the stylus 3 of the measurement device has a spherical surface having a radius of curvature of 0.4 mm or less. At the time of measurement, the stylus 3 is disposed so as to be opposed to each of the measurement positions 31 to 33 on the side wall surface 11w of the glass substrate G, and performs the measurement on those positions in succession.

The respective outlines 31a to 33a of the measurement positions 31 to 33 are obtained by rotating the glass substrate G by one cycle in a state in which the stylus 3 is disposed so as to be opposed to the measurement positions 31 to 33. An inscribed circle and a circumscribed circle are respectively obtained based on the center derived by the least squares method with respect to the three obtained outlines 31a to 33a, and a circumscribed circle C2 that is in contact with the outermost side and an inscribed circle C1 that is in contact with the innermost side are determined. The radius difference R between the circumscribed circle C2 and the inscribed circle C1 is derived as the cylindricity of the side wall surface 11w.

The cylindricity of the side wall surface 11w is adjusted by chamfering processing with a formed grindstone, edge surface grinding processing, and brushing, for example.

With regard to the surface roughness of the side wall surface 11w on the outer circumferential side, in the case where the maximum height in the substrate thickness direction is Rz(t) and the maximum height in the circumferential direction is Rz(c), Rz(t)/Rz(c) is preferably 1.2 or less, and more preferably 1.1 or less. If Rz(t)/Rz(c) exceeds the above-described range, there are cases in which variation in the shape evaluation value of substrates is likely to increase at the time of mass production. By setting Rz(t)/Rz(c) to a value in the above-described range, it is possible to reduce variation in the shape evaluation value.

It should be noted that the value of surface roughness can be obtained by measuring the side wall surface 11w with a wavelength bandwidth in which the surface roughness is measured using a laser microscope set from 0.25 μm to 80 μm, for example, and selecting and analyzing a region of 50 μm square in the measured range. The surface roughness in the substrate thickness direction and the circumferential direction can take an average value of data obtained by measuring the line roughness of the region of 50 μm square, for example, from a plurality of cross-sections respectively corresponding in the substrate thickness direction and the circumferential direction. For example, it is sufficient that five sets of data are obtained and the average thereof is used as the surface roughness.

The surface roughness of the side wall surface 11w on the outer circumferential side preferably has a maximum height Rz of 0.2 μm or less and more preferably 0.1 μm or less. Also, the surface roughness thereof preferably has an arithmetic mean roughness Ra of 0.02 μm or less. Setting Rz and Ra in this range can prevent thermal asperity resulting from adherence or digging in of foreign substances and corrosion resulting from the deposition of ions such as sodium and potassium. Also, for similar reasons to those described above, it is also preferable that the surface roughness of the pair of chamfered surfaces 11c and 12c is in the above-described range. Here, the above-described Rz refers to the maximum height defined by JIS B 0601:2001. Ra refers to the arithmetic mean roughness defined by JIS B 0601:2001.

In this embodiment, when a measurement point is provided every 30 degrees in the circumferential direction, referenced on the center of the glass substrate G, and a radius of curvature of a shape of a portion between the side wall surface 11w and the chamfered surfaces 11c and 12c at the measurement point is derived, it is preferable that a difference in the radius of curvature between adjacent measurement points is set to 0.01 mm or less. The number of measurement points is 12. Accordingly, it is possible to reduce changes in the shape of the outer circumferential edge surface in the circumferential direction of the magnetic-disk glass substrate G, and reduce variation in the shape evaluation value of the outer circumferential edge portion. It should be noted that the difference in the radius of curvature between adjacent measurement points is more preferably 0.005 mm or less, because variation in the shape evaluation value of the outer circumferential edge portion can be further reduced.

Figure 6:
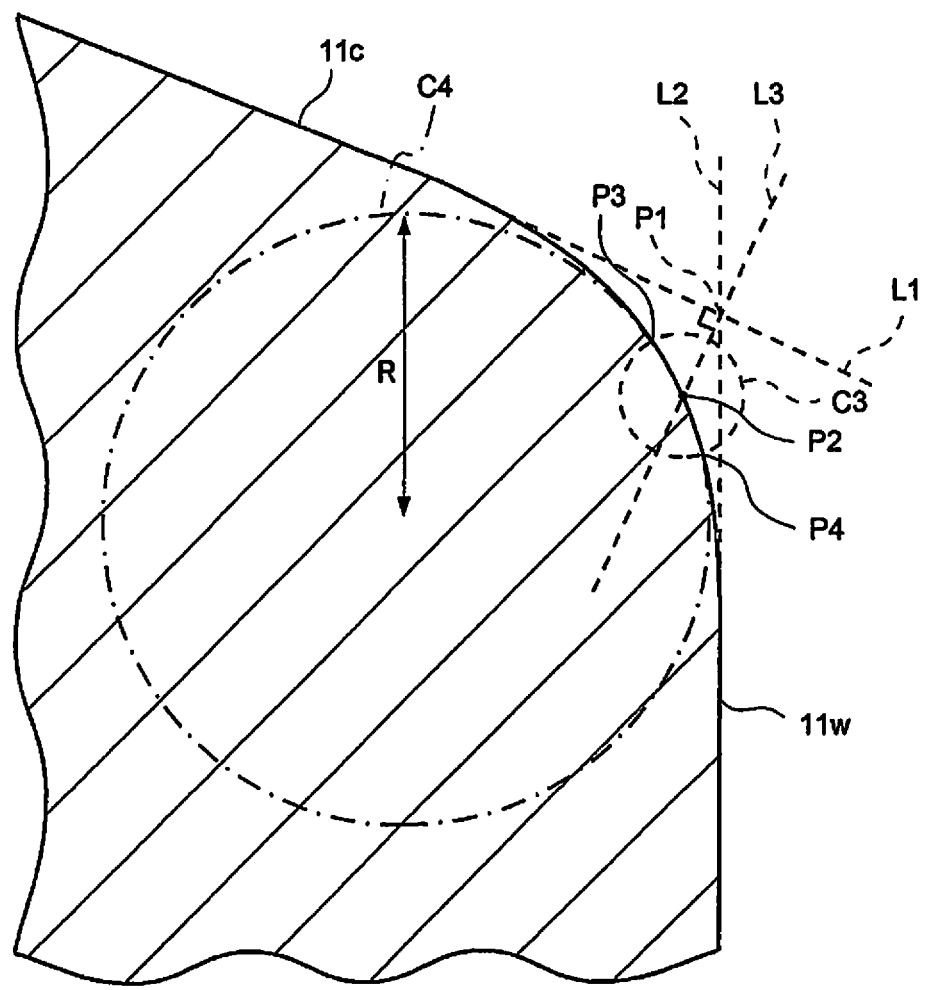
FIG. 6 is an enlarged view of a portion of a cross-section of the outer circumferential side of the magnetic-disk glass substrate of the embodiment.

Referring to FIG. 6, the radius of curvature of the shape of a portion between the side wall surface 11w and the chamfered surface 11c is derived as follows, for example. FIG. 6 is an enlarged view of a portion of an outer circumferential cross-section of the magnetic-disk glass substrate G of this embodiment.

First, on the cross-section of the glass substrate in the substrate thickness direction at one measurement point, an intersection point of a first virtual line L1 obtained by extending a linear portion of the chamfered surface 11c and a second virtual line L2 obtained by extending a linear portion of the side wall surface 11w is given as a "first intersection point P1". Next, a third virtual line L3 passing through the first intersection point P1 and extending perpendicular to the linear portion of the chamfered surface 11c is set. Next, an intersection point of the third virtual line L3 and the portion between the side wall surface 11w and the chamfered surface 11c is given as a "second intersection point P2". Also, a first circle C3 having a predetermined radius (50 μm, for example) around the second intersection point P2 is set on the cross-section of the magnetic-disk glass substrate G. Also, two intersection points of an outer circumference of the first circle C3 and the portion between the side wall surface 11w and the chamfered surface 11c are respectively given as a "third intersection point P3" and a "fourth intersection point P4". Furthermore, a second circle C4 respectively passing through the second, third, and fourth intersection points P2, P3, and P4 are set. By deriving the radius R of the second circle C4, the radius of curvature of the shape of the portion between the side wall surface 11w and the chamfered surface 11c can then be derived.

It should be noted that the radii of curvature of shapes of both portions between the side wall surface and the chamfered surface adjacent to one main surface and between the side wall surface and the chamfered surface adjacent to the other main surface can also be derived in the manner described above.

The magnetic-disk glass substrate G described above has an extremely small roundness and shape evaluation value. Therefore, disturbance of air flow is unlikely to occur at the outer circumferential side edge portion, thus suppressing flutter. This makes it possible to retain the tracking performance for servo information at the outer circumferential side edge portion. In particular, the tracking performance for servo information is more rigorously required in a disk having a high track recording density, such as a magnetic disk to which a shingle write system is applied, and this glass substrate G can be favorably used in the magnetic disk.

It is thought that the reason why flutter is suppressed due to a small shape evaluation value is as follows. If the outer circumferential edge portion of the glass substrate G has a large roundness, the amount of air pushed in the horizontal direction (radial direction) by the outer circumferential edge surface of the magnetic disk varies, causing a large disturbance of air flow. However, if the outer circumferential edge surface has an extremely small roundness, such a large disturbance of air flow is unlikely to occur. In a state in which the outer circumferential edge surface has an extremely small roundness, rather than air flow in the horizontal direction, it is the smoothness with which air flows in the substrate thickness direction through the gap between the outer circumferential edge portion of the glass substrate G and the inner wall of the HDD so as to span the magnetic disk that is important.

With the studies conducted by the inventor of the present invention, it was found that in a HDD, the air steadily flows in the substrate thickness direction through the gap between the inner wall of the HDD and the outer circumferential edge surface of the magnetic disk, and if a phenomenon that disturbs the flow and makes it irregular occurs, the level of flutter increases and the magnetic head flies unstably. Conversely, if the outer circumferential edge surface of the glass substrate G has a small shape evaluation value, the air steadily flows smoothly in the substrate thickness direction through the gap between the inner wall of the HDD and the outer circumferential edge surface of the magnetic disk, and thus the level of flutter is unlikely to increase.

As described above, in a HDD having an extremely high track recording density, the disturbance of air flow in the HDD is an important factor in improving the tracking performance of the magnetic head for servo information. Such disturbance of the air causes flutter to increase. There are two types of air disturbance, namely, disturbance that occurs periodically (steadily) and disturbance that occurs unexpectedly. Of these, the disturbance that occurs periodically can often be eliminated by changing the design of the HDD, but the disturbance that occurs unexpectedly cannot be suppressed by changing the design of the HDD, and therefore, it is required to suppress this disturbance using another means. The inventor of the present invention found that the outer circumferential edge surface of the glass substrate G caused disturbance of air flow that could not be eliminated by changing the design of the HDD, and thus achieved the glass substrate G in which the outer circumferential edge surface had an extremely small shape evaluation value.

The glass substrate G of this embodiment has a substrate thickness of 0.8 mm, 0.635 mm, or 0.5 mm or less, for example. In the case where the glass substrate G is used in a magnetic disk, the magnetic disk is more likely to rattle and flutter is more likely to increase as the glass substrate G becomes thinner. However, the glass substrate G has the shape evaluation value of 1 μm or less as described above, and therefore, in the case where the glass substrate G is used in a magnetic disk, disturbance of air flow is suppressed at the outer circumferential side edge portion, and flutter is suppressed.

Furthermore, it is preferable that the glass substrate G of this embodiment has an extremely small shape evaluation value and the outer circumferential edge surface thereof has a shape that is unlikely to cause disturbance of air flow. If the shape evaluation value is smaller, in the case where the glass substrate G is used in a magnetic disk, flutter can be further suppressed. This makes the tracking performance of the magnetic head for servo information in the HDD more favorable.

When a magnetic disk on which a magnetic layer having a track recording density of 500 kTPI (tracks per inch) or more, in particular, is formed, such as a magnetic disk for a shingle write system or a magnetic disk for energy-assisted magnetic recording, is incorporated in the HDD, the tracking performance of the magnetic head of the HDD for servo information may be deteriorated in the case where the magnetic disk flutters, and therefore, the magnetic-disk glass substrate of this embodiment is preferable for the magnetic disk having a high recording density described above.

It is preferable that the glass substrate G of this embodiment has a dub off value, which is an evaluation index of the outer circumferential edge portion on the main surface, of 30 nm or less. In addition, it is preferable that the dub off value is greater than zero. When an outline between two points that are a point at a radius of 31.2 mm and a point at a radius of 32.2 mm is measured in an outline of the main surface of the glass substrate G in the radial direction and the two points are connected by a virtual straight line, the dub off value refers to a maximum distance from the virtual straight line to the outline of the main surface of the glass substrate G. It should be noted that when the virtual straight line is compared with the outline of the main surface and the virtual straight line is located on the center side in the substrate thickness direction, the dub off value is positive. Conversely, when the outline of the main surface is located on the center side in the substrate thickness direction, the dub off value is negative. The closer to zero this value is, the flatter and more favorable the shape of the main surface near the outermost circumference is, and therefore, the magnetic head flies stably. Accordingly, this in combination with an extremely small roundness and shape evaluation value can suppress disturbance of air flow at the outer circumferential edge portion of the substrate, reduce variation in flutter, and improve the yield of HDDs at the time of mass production. The dub off value can be measured using an optical surface shape measurement device, for example. It should be noted that the dub off value in this description is obtained by measuring a region on the outer circumferential side with respect to the conventional measurement range. This makes it possible to evaluate a difference in the shape of the edge portion with higher accuracy than before.

It is preferable that in the glass substrate G of this embodiment, the main surface on the outer circumferential side edge portion of the main surface has a nanowaviness (NW-Rq) of 0.5 Å or less. Here, the nanowaviness can be expressed by an RMS (Rq) value calculated as roughness having a wavelength bandwidth of 50 to 200 μm in an annular region of a radius of 30.5 to 31.5 mm, and can be measured using an optical surface shape measurement device, for example. This in combination with an extremely small roundness and cylindricity can suppress disturbance of air flow at the outer circumferential edge portion of the substrate, reduce variation in flutter, and improve the yield of HDDs at the time of mass production.

[Method for Manufacturing Magnetic-Disk Glass Substrate]

Hereinafter, a method for manufacturing a magnetic-disk glass substrate of this embodiment will be described step-by-step. It should be noted that the order of the steps may be changed as appropriate.

(1) Glass Substrate Formation

A raw glass plate is molded by press molding and processing is appropriately performed to form an inner hole and an outer shape to obtain a disk-shaped glass substrate having the inner hole having a predetermined substrate thickness, for example. It should be noted that the method for molding a raw glass substrate is not limited to these methods and a glass substrate can also be manufactured by a known manufacturing method such as a float method, a down draw method, a redraw method, or a fusion method.

(2) Edge Surface Grinding Step

Next, the edge surfaces of the annular glass substrate are ground. The edge surfaces of the glass substrate are ground in order to form chamfered surfaces at the outer circumferential side edge portion and the inner circumferential side edge portion of the glass substrate, and adjust the outer and inner diameters of the glass substrate. The grinding processing performed on the outer circumferential side edge surface of the glass substrate may be known chamfering processing with a formed grindstone using diamond abrasive particles, for example.

The outer circumferential side edge surface of the glass substrate of this embodiment is ground using a formed grindstone and by additional grinding processing in which a grindstone is brought into contact with the edge surface of the glass substrate such that a locus of the grindstone, which is in contact with the edge surface of the glass substrate, is not constant. Hereinafter, the additional grinding processing on the outer circumferential side edge surface of the glass substrate will be described.

A grindstone used to additionally grind the outer circumferential side edge surface of the glass substrate G is formed in a cylindrical shape as a whole and has a groove. The groove is formed so as to be capable of simultaneously grinding both the side wall surface 11w and the chamfered surface 11c of the glass substrate G on the outer circumferential side. Specifically, the groove has a groove shape including a side wall portion and chamfering portions located on both sides of the side wall portion. The side wall portion and the chamfering portions of the groove described above are formed so as to have predetermined dimensions and shapes in consideration of the finishing target dimensions and shapes of the ground surfaces of the glass substrate G.

In the processing of the outer circumferential side edge surface of the glass substrate, the grinding processing is performed by rotating both the glass substrate G and the grindstone while bringing the grindstone into contact with the outer circumferential side edge surface of the glass substrate G in a state in which the glass substrate G is inclined with respect to the groove direction of the groove formed in the grindstone, that is, in a state in which a rotation axis of the glass substrate G is inclined at an angle α with respect to a rotation axis of the grindstone. Accordingly, the locus of the grindstone that abuts against the outer circumferential side edge surface of the glass substrate G is not constant, and the abrasive particles of the grindstone abut against and act on the edge surface of the substrate at random positions. Therefore, since impairment of the substrate is reduced, the surface roughness of the ground surface is reduced, and in-plane variation is reduced, it is possible to make the ground surface smoother, that is, to finish the ground surface with a quality of a level that meets the requirement for higher quality. Furthermore, the effect of improving the life of the grindstone is obtained.

Moreover, the grindstone and the glass substrate G are in contact with each other in a state in which the groove of the grindstone and an outer diameter arc of the glass substrate G are in contact with each other in a surface contact state, thus increasing a contact area between the grindstone and the glass substrate G. Therefore, a contact length (cutting blade length) of the grindstone with respect to the glass substrate G is extended, thus making it possible to maintain the sharpness of the abrasive particles. Accordingly, stable grinding performance can be secured even in the case where the grinding processing is performed using a grindstone with fine abrasive particles that is advantageous in terms of the quality of the ground surface, and the favorable quality of the ground surface (mirror surface quality) can be stably obtained by grinding processing mainly using a plastic mode. In addition, the sharpness of the grindstone is maintained and the grinding performance for achieving the plastic mode is stably secured, thus making it possible to secure the favorable accuracy of dimensions and shapes obtained by chamfering processing performed on the outer circumferential side edge surface of the glass substrate.

Although the inclination angle α of the glass substrate G with respect to the groove direction of the grindstone described above can be set arbitrarily, it is preferable that the inclination angle α is in a range of two to eight degrees in order to more favorably exhibit the operations and effects described above. In particular, in order to improve the surface quality of the polished glass substrate G after the grinding and reduce the machining allowance for the outer circumferential side edge surface and the inner circumferential side edge surface of the glass substrate G in the brushing, it is preferable that the inclination angle α is large. It is preferable that the grindstone used in the grinding processing is a grindstone obtained by binding diamond abrasive particles with resin (resin bond grindstone). It is preferable to use a 2000# to 3000# diamond grindstone.

A preferable example of the circumferential speed of the grindstone is 500 to 3000 m/minute, and the circumferential speed of the glass substrate G is about 1 to 30 m/minute. In addition, it is preferable that the ratio (circumferential speed ratio) of the circumferential speed of the grindstone with respect to the circumferential speed of the glass substrate G is in a range of 50 to 300.

It should be noted that the above-described grinding step can be divided into two steps, and first grinding is performed in a state in which the rotation axis of the glass substrate G is inclined at an angle α (α>0), as described above, second grinding is performed in a state in which the rotation axis of the glass substrate G is inclined at an angle −α using another grindstone, and adjustment is performed such that the machining allowance of the second grinding is smaller than the machining allowance of the first grinding, as a result of which Rz(t)/Rz(c) can be 1.2 or less.

It is preferable that the hardness (referred to as "grindstone hardness" hereinafter) obtained by measuring a binder (resin) portion on the grindstone surface of the above-described resin bond grindstone using a Berkovich indenter under conditions where an indentation load is 250 mN by a nanoindentation test method is in a range of 0.4 to 1.7 GPa. In the case of the resin bond grindstone, the grindstone hardness is an index that is correlated with a bond strength between the diamond abrasive particles and the resin.

As a result of grinding the outer circumferential side edge surface using resin bond grindstones having various characteristics and observing processed quality of the edge surface of the glass substrate, the inventor of the present invention found that the bond strength between the diamond abrasive particles and the resin in the resin bond grindstone had a large influence on the shape evaluation value of the inner hole of the glass substrate subjected to the above-described grinding processing. That is, it was found that if the outer circumferential side edge surface was ground using a resin bond grindstone having a grindstone hardness that is too high, the processing rate was favorable but the surface was likely to be blemished and the shape evaluation value of the outer circumference deteriorated, whereas if the outer circumferential side edge surface was ground using a resin bond grindstone having a grindstone hardness that is too low, the shape evaluation value of the outer circumference was favorable but the processing rate decreased markedly. In other words, the shape evaluation value of the outer circumference of the glass substrate can be adjusted by changing the grindstone hardness. As a result, it was found that the grindstone hardness was preferably in the above-described range. By setting the grindstone hardness in the above-described range, it is possible to process the outer circumferential side edge surface after being ground to a semi-mirror surface, and therefore, the machining allowance can be reduced in a subsequent edge surface polishing step, thus making it possible to improve the shape accuracy of the edge portion including the shape evaluation value of the outer circumference while maintaining high surface quality.

A method for measuring grindstone hardness by a nanoindentation test method will be described. A load is applied at 1 nm/sec to a binder portion of the grindstone surface, which is the measurement target, using a Berkovich indenter having a quadrangular pyramidal tip, the pressure is increased to 250 mN and held for a predetermined time (10 seconds, for example), and then a relationship between the load and the displacement when the pressure is reduced at an unloading rate equivalent to when the pressure was increased is obtained. A curve obtained here indicates dynamic hardness, which is a characteristic closer to actual use conditions than evaluation of hardness, which is a conventional static hardness characteristic. Based on the result of the obtained curve of dynamic hardness characteristics, grindstone hardness can be obtained by the nanoindentation test method using Equation (1) below.

$$H = F/Ac \quad (1)$$

where H is the hardness of the grindstone, F is a load, and Ac is an indentation area.

The above-described indentation area Ac is expressed by relational expressions (2) and (3) below.

$$Ac = f(hc) \propto 24.5 \cdot hc^2 \quad (2)$$

$$hc = h\max - \epsilon \cdot F/S \quad (3)$$

where hc is an indentation depth, hmax is a depth at maximum load, hs is an indentation depth at the start of unloading, ho is an indentation depth after unloading, $\epsilon$ is a shape coefficient specific to the indenter (e.g.: in case of a Berkovich indenter=0.75), S is a proportionality coefficient of the load and displacement, and m is a slope (dF/dh).

(3) Edge Surface Polishing Step

Next, the edge surfaces of the annular glass substrate are polished. The edge surfaces of the glass substrate are polished in order to improve the properties of the outer circumferential side edge surface and the inner circumferential side edge surface (side wall surface and chamfered surfaces) of the glass substrate. In the edge surface polishing step, the outer circumferential side edge surface and the inner circumferential side edge surface of the glass substrate are polished by brushing. The machining allowance for the glass substrate in the brushing is set such that the surfaces of the side wall surface 11w, and the chamfered surfaces 11c and 12c are mirror-surfaces.

By performing the edge surface grinding and the edge surface polishing described above, contamination by attached waste and the like and impairment such as scratches on the edge surface of the glass substrate can be eliminated, thermal asperity and deposition of ions such as sodium and potassium that causes corrosion can be prevented, and surface roughness and waviness can also be significantly reduced and the shape evaluation value of the outer circumferential edge surface of the glass substrate can be reduced, thus making it possible to improve the shape accuracy of the outer circumferential edge portion.

(4) First Polishing (Main Surface Polishing) Step

After the main surface grinding step is appropriately performed as required, first polishing is performed on the ground main surfaces of the glass substrate. In the first polishing step, the main surfaces of the glass substrate are polished using a double-side polishing device provided with a planetary gear mechanism. The double-side polishing device has an upper surface plate and a lower surface plate. Planar polishing pads are attached to the upper surface of the lower surface plate and the bottom surface of the upper surface plate. One or more glass substrates accommodated in a carrier are sandwiched between the upper surface plate and the lower surface plate, and the glass substrate and the surface plates are moved relative to each other by the planetary gear mechanism moving one or both of the upper surface plate and the lower surface plate while supplying loose abrasive particles including an abrasive, so that both main surfaces of the glass substrate can be polished.

During the relative motion described above, the upper surface plate is pressed against the glass substrate (that is, in a vertical direction) with a predetermined load, the polishing pads are pressed against the glass substrate, and a polishing liquid is supplied between the glass substrate and the polishing pads. The main surfaces of the glass substrate are polished by the abrasive included in this polishing liquid. Known abrasive particles such as cerium oxide, zirconium oxide, and silicon dioxide can be used as the abrasive, for example. It should be noted that this step may be divided into a plurality of steps in which the type or size of the abrasive particles is changed.

(5) Chemical Strengthening Step

Furthermore, as required, the glass substrate that was subjected to the first polishing step may be chemically strengthened.

A molten liquid of mixed salts of potassium nitrate and sodium nitrate, for example, can be used as a chemical strengthening liquid. Chemical strengthening processing is performed by immersing the glass substrate in the chemical strengthening liquid, for example.

In this manner, by immersing the glass substrate in the chemical strengthening liquid, lithium ions and sodium ions in the surface layer of the glass substrate are respectively replaced by sodium ions and potassium ions with a relatively large ion radius in the chemical strengthening liquid, and the glass substrate is strengthened.

(6) Second Polishing (Final Polishing) Step

Next, second polishing is performed on the glass substrate. In the second polishing, a polishing device similar to that in the first polishing can be used, for example. At this time, the second polishing differs from the first polishing in the type and size of loose abrasive particles and the hardness of the resin polisher.

Microparticles of colloidal silica or the like suspended in a slurry, for example, are used as the loose abrasive particles that are used in the second polishing. This makes it possible to further reduce the surface roughness of the main surfaces of the glass substrate and to adjust the shape of the edge portion in a preferable range.

A magnetic-disk glass substrate can be obtained in this manner.

[Magnetic Disk]

A magnetic disk can be obtained as follows using the magnetic-disk glass substrate.

A magnetic disk has a configuration in which at least an adherent layer, a base layer, a magnetic layer (magnetic recording layer), a protecting layer and a lubricant layer are laminated on the main surface of the magnetic-disk glass substrate (referred to as merely "substrate" hereinafter) in this order from the main surface side, for example.

For example, the substrate is introduced into a film deposition device that has been evacuated and the layers from the adherent layer to the magnetic layer are sequentially formed on the main surface of the substrate in an Ar atmosphere by a DC magnetron sputtering method. CrTi can be used in the adherent layer and CrRu can be used in the base layer, for example. A CoPt-based alloy can be used in the magnetic layer, for example. Also, a CoPt-based alloy or a FePt-based alloy having an $L_{10}$ ordered structure is formed as the magnetic layer for thermally assisted magnetic recording. After the film deposition as described above, by forming the protecting layer using $C_2H_4$ by a CVD method, for example, and subsequently performing nitriding processing that introduces nitrogen to the surface, a magnetic recording medium can be formed. Thereafter, by coating the protecting layer with perfluoropolyether (PFPE) by a dip coat method, the lubricant layer can be formed.

The produced magnetic disk is preferably incorporated in a magnetic-disk drive (hard disk drive (HDD)) serving as a magnetic recording and reproduction device provided with a magnetic head equipped with a dynamic flying height (DFH) control mechanism and a spindle for fixing the magnetic disk.

Working Examples and Comparative Examples

In order to confirm the effect of the magnetic-disk glass substrate of this embodiment, 2.5-inch magnetic disks (having an outer diameter of 65 mm, an inner diameter of 20 mm, and a substrate thickness of 0.635 mm, and an angle of the chamfered surface of 45 degrees with respect to the main surface) were produced using manufactured magnetic-disk glass substrates. It should be noted that the shape of the cross-section of the chamfered surface in the radial direction was linear, the angle with respect to the main surface was 45 degrees, the length of the chamfered surface in the substrate thickness direction was 0.15 mm, and the length of the chamfered surface in the radial direction was 0.15 mm. The glass composition of the produced magnetic-disk glass substrate was as follows.

(Glass Composition)

Amorphous aluminosilicate glass was used that contained $SiO_2$ in an amount of 63 mol %, $Al_2O_3$ in an amount of 10 mol %, $Li_2O$ in an amount of 1 mol %, $Na_2O$ in an amount of 6 mol %, MgO in an amount of 19 mol %, CaO in an amount of 0 mol %, SrO in an amount of 0 mol %, BaO in an amount of 0 mol %, and $ZrO_2$ in an amount of 1 mol %.

It should be noted that the molar ratio of the content of CaO to the total content of MgO, CaO, SrO and BaO (CaO/(MgO+CaO+SrO+BaO)) was zero, and the glass-transition temperature was 703° C.

[Production of Magnetic-Disk Glass Substrates of Working Examples and Comparative Examples]

The magnetic-disk glass substrates of working examples were produced by performing the steps of the method for manufacturing a magnetic-disk glass substrate according to this embodiment in the given order.

Here, the press molding method was used in molding of the glass substrate, and an inner hole and an outer shape were formed, and the substrate thickness was adjusted using a known method.

In the edge surface grinding step, chamfering and side wall surface processing was performed on the inner circumferential side edge surface and the outer circumferential side edge surface of the glass substrate with a formed grindstone using diamond abrasive particles to form chamfered surfaces and a side wall surface. Furthermore, with regard to the outer circumferential side edge surface of the glass substrate, by adding grinding processing in which the edge surface of the glass substrate was inclined and brought into contact with the grindstone such that the locus of the grindstone abutting against the edge surface of the glass substrate was not constant, surface quality was further improved while increasing the shape accuracy of the chamfered surfaces and the side wall surface.

The additional grinding processing was performed on the outer circumferential side edge surface of the glass substrate using a resin bond grindstone with 2500# diamond abrasive particles under the following grinding conditions. At that time, the inclination angle (a described above) of the glass substrate with respect to the groove direction of the grindstone was set to 5 degrees and other conditions were adjusted as appropriate. At that time, glass substrates that have different shape evaluation values of the outer circumferential edge surface were produced by adjusting the inclination angle (a described above) and other factors (e.g., grit of the grindstone, and circumferential speed of the grindstone or the glass substrate) in the above-described range as appropriate. It should be noted that although in the case of a working example 1 in Table 1, $\alpha=5$ degrees, by further increasing the inclination angle, the surface quality is improved after the grinding and the machining allowance for brushing performed thereafter can be reduced, and thus it is possible to further improve the shape evaluation value.

In the edge surface polishing step, the brushing was performed on the inner circumferential side edge surface and the outer circumferential side edge surface of the glass substrate, using a slurry containing cerium oxide abrasive particles as polishing abrasive particles. It should be noted that the machining allowance for a chamfered surface in the edge surface polishing step was adjusted in accordance with the surface quality after the edge surface grinding step as appropriate.

Thereafter, grinding was performed on the main surface using a known method, and then two-step polishing and chemical strengthening were performed thereon. A polishing liquid containing cerium oxide abrasive particles was used in the first polishing, and a polishing liquid containing colloidal silica polishing abrasive particles was used in the second polishing. The chemical strengthening was performed before the second polishing. The glass substrate on which polishing has been performed was cleaned using a known cleaning method as appropriate.

Through the above steps, the magnetic-disk glass substrates of the working examples and comparative examples were produced as shown in Table 1.

The roundness of the side wall surface of the magnetic-disk glass substrate was measured by the above-described method. The shape evaluation value was calculated as shown in FIG. 2. Specifically, outlines were obtained at positions on the side wall surface that were spaced apart upward and downward by 100 μm from the central position of the side wall surface in the substrate thickness direction and positions on the chamfered surface that were spaced apart by 75 μm from the upper and lower main surfaces in the central direction of the substrate thickness, the centers of the least square circles of the outlines that were measured based on the two positions on the side wall surface were determined, a midpoint (A) and centers (B and C) of the least square circles of the outlines of the chamfered surfaces were viewed in the substrate thickness direction, a distance between A and B and a distance between A and C were derived, and a value obtained by adding these distances was used as the shape evaluation value of the outer circumferential edge portion. All measurements were performed using a roundness/cylindrical shape measurement device.

[Evaluation Method]

The magnetic-disk glass substrates were formed into films as described above to produce magnetic disks of working examples and comparative examples. Fluttering was evaluated by measuring fluttering characteristic values of the samples of the magnetic disks of the working examples and the comparative examples using a laser Doppler vibrometer. In the measurement of the fluttering characteristic value, a magnetic disk was mounted on the spindle of a 2.5-inch type HDD and rotated, and the main surface of the rotating magnetic disk was irradiated with a laser beam from the laser Doppler vibrometer. It should be noted that the cover of the HDD was provided with a hole for laser beam irradiation. Next, the laser Doppler vibrometer received the laser beam reflected by the magnetic disk, and thus the amount of vibration in the thickness direction of the magnetic disk was measured as a fluttering characteristic value. At this time, the fluttering characteristic values were measured under the following conditions.

Environment for HDD and measurement system: The temperature was kept at 25° C. in a constant temperature and humidity chamber.
Rotation rate of magnetic disk: 7200 rpm
Laser beam irradiation position: Position 31 mm apart from the center (1.5 mm apart from the outer circumferential edge) of a magnetic disk in the radial direction
Minimum value of diameter of inner wall of disk-attaching portion in HDD housing: 65.880 mm

[Evaluation Criterion]

As described below, the results of evaluation of the measured fluttering characteristic values were divided into four levels, Levels 1 to 4, in descending order of favorability (that is, in increasing order of the fluttering characteristic value). Levels 1 and 2 are acceptable for practical purposes for a HDD of 500 kTPI.

Level 1: 20 nm or less
Level 2: more than 20 nm to 30 nm or less
Level 3: more than 30 nm to 40 nm or less
Level 4: more than 40 nm

TABLE 1

|  | Roundness (μm) | Shape evaluation value (μm) | Evaluation result |
|---|---|---|---|
| Comp. Ex. 2 | 1.7 | 1.0 | Level 4 |
| Comp. Ex. 1 | 1.5 | 1.3 | Level 3 |
| Work. Ex. 1 | 1.5 | 1.0 | Level 2 |
| Work. Ex. 2 | 1.0 | 0.8 | Level 2 |
| Work. Ex. 3 | 1.0 | 0.5 | Level 1 |
| Work. Ex. 4 | 0.8 | 0.3 | Level 1 |

It was confirmed from the evaluation results in Table 1 that if the roundness exceeded 1.5 μm (comparative example 2), fluttering characteristics were large and not acceptable. In addition, in the case where the shape evaluation value exceeded 1 μm (comparative example 1), even if the roundness was 1.5 μm or less, fluttering characteristics were not favorable. On the other hand, in the case where the roundness was 1.5 μm or less and the shape evaluation value was 1 μm or less (working examples 1 to 4), fluttering characteristics were favorable. It should be noted that as shown in the working examples 3 and 4, in the case where the shape evaluation value was 0.5 μm or less, it was confirmed that fluttering characteristics were particularly favorable. As shown in the working examples 1 to 4, it is conceivable that in the case where fluttering characteristics were favorable, an error was unlikely to occur when a magnetic signal was written to or read out from the magnetic disk of the HDD, and positioning accuracy using a servo of the HDD was favorable.

It should be noted that when a magnetic-disk glass substrate having a roundness of 1.7 μm and a shape evaluation value of 0.5 μm (comparative example 3) was prepared and fluttering characteristic values were measured using the glass substrate, the level was 4. According to this, it was found that even in the case where the shape evaluation value was 1.0 μm or less and the roundness exceeded 1.5 μm, the level of flutter was not favorable.

Next, ten magnetic-disk glass substrates of the working example 1 described above and ten magnetic-disk glass substrates of the working examples 5 and 6 were produced, and Rz, Ra, an average value of Rz(t)/Rz(c), and variation in shape evaluation values were derived. Rz of each glass substrate was 0.2 μm or less. It should be noted that Ra of each glass substrate was 0.02 μm or less. The magnetic-disk glass substrates of the working examples 5 and 6 were produced under the production conditions of the working example 1 except that only the edge surface grinding step was different. Specifically, in the working examples 5 and 6, when the outer circumferential side edge surface was ground in the edge surface grinding step, the first grinding was performed such that the inclination angle (a described above) of the glass substrate with respect to the groove direction of the grindstone was 5 degrees, the second grinding was then performed such that the inclination angle of the glass substrate was −5 degrees using another grindstone, and adjustment was performed such that the machining allowance of the second grinding was smaller than the machining allowance of the first grinding. The evaluation results of the working examples 1, 5, and 6 are shown in Table 2. In Table 2, the average value of Rz(t)/Rz(c) is the average value of Rz(t)/Rz(c) of the ten magnetic-disk glass substrates, and "variation in the shape evaluation value" is the difference between the maximum value and the minimum value of shape evaluation values of the ten magnetic-disk glass substrates.

It could be found from Table 2 that Rz(t)/Rz(c) was 1.2 or less, and thus variation in the shape evaluation value decreased. Also, it could be found that if Rz(t)/Rz(c) was 1.1 or less, variation in the shape evaluation value further decreased.

TABLE 2

|  | Average value of Rz(t)/Rz(c) | Variation in shape evaluation value (μm) |
|---|---|---|
| Work. Ex. 1 | 1.29 | 0.17 |
| Work. Ex. 5 | 1.16 | 0.10 |
| Work. Ex. 6 | 1.08 | 0.07 |

Next, ten samples (working examples 7 and 8) were produced under the production conditions of the working example 1 except that the machining allowance of the edge surface grinding was changed, and variation in the shape evaluation values of the working examples 7 and 8 was derived. Variation in the shape evaluation value is, similarly to that shown in Table 2, the difference between the maximum value and the minimum value of shape evaluation values of the ten samples.

Also, with regard to the working examples 1, 7, and 8, the radius of curvature of the portion between the side wall surface and the chamfered surface of the outer circumferential edge portion was derived. It should be noted that the shape prepared in the grinding step is better maintained as the machining allowance of the edge surface polishing decreases, and thus shape accuracy can be increased. In other words, the difference in the radius of curvature can be reduced at adjacent measurement positions in the circumferential direction of the outer circumferential edge portion.

The radius of curvature of one glass substrate was derived as follows. Specifically, 24 points of the outer circumferential edge portion, namely 12 points on the front surface side and 12 points on the back surface side, were measured in total. Then, a difference in the radius of curvature between adjacent measurement points in the 12 points on the front surface side (twelve sets of data) and a difference in the radius of curvature between adjacent measurement points in the 12 points on the back surface side (twelve sets of data) were derived, and among twenty-four sets of data in total, the maximum value was used as the maximum value of the radius of curvature of the glass substrate. Examples of measurement data are shown in Table 3. In Table 3, the front surface and the back surface of the glass substrate, which was the measurement target, are respectively referred to as "A surface" and "B surface". Also, in Table 3, a difference in the radius of curvature when "0 to 30 degrees" means the absolute value of differences in the radii of curvature between a measurement point at 0 degrees and a measurement point at 30 degrees, for example. Also, the position of the A surface at 30 degrees on the back side corresponded to the position of the B surface at 30 degrees, for example.

When the maximum value of a difference in the radius of curvature was derived with regard to the ten samples of the working examples 1, 7, and 8, the ten samples of the working example 1 had a maximum value of 0.010 mm or less, the ten samples of the working example 7 had a maximum value of 0.005 mm or less, and the ten samples of the working example 8 had a maximum value of 0.012 mm or less. Examples of measurement data shown in Table 3 are data of one sample having the largest maximum value of differences in the radii of curvature of the working examples.

With regard to the working examples 1, 7, and 8, Table 4 shows the maximum value of differences in the radii of curvature (same as the value indicated in Table 3; the maximum value of ten samples) and variation in the shape evaluation values.

It could be found from Table 4 that by setting the maximum value of differences in radii of curvature to 0.01 mm or less, variation in the shape evaluation values could be significantly reduced.

TABLE 3

| | Difference in radius of curvature (mm) | | | | | |
|---|---|---|---|---|---|---|
| | Work. Ex. 1 | | Work. Ex. 7 | | Work. Ex. 8 | |
| | A surface | B surface | A surface | B surface | A surface | B surface |
| 0 to 30 degrees | 0.005 | 0.006 | 0.002 | 0.003 | 0.003 | 0.011 |
| 30 to 60 degrees | 0.004 | 0.005 | 0.002 | 0.004 | 0.010 | 0.010 |
| 60 to 90 degrees | 0.004 | 0.006 | 0.001 | 0.003 | 0.009 | 0.001 |
| 90 to 120 degrees | 0.005 | 0.009 | 0.004 | 0.002 | 0.011 | 0.004 |
| 120 to 150 degrees | 0.005 | 0.009 | 0.002 | 0.001 | 0.004 | 0.002 |
| 150 to 180 degrees | 0.008 | 0.010 | 0.003 | 0.002 | 0.004 | 0.003 |
| 180 to 210 degrees | 0.006 | 0.009 | 0.001 | 0.003 | 0.010 | 0.001 |
| 210 to 240 degrees | 0.004 | 0.007 | 0.003 | 0.004 | 0.003 | 0.004 |
| 240 to 270 degrees | 0.005 | 0.008 | 0.002 | 0.005 | 0.001 | 0.002 |
| 270 to 300 degrees | 0.003 | 0.008 | 0.003 | 0.003 | 0.012 | 0.003 |
| 300 to 330 degrees | 0.003 | 0.007 | 0.005 | 0.001 | 0.009 | 0.005 |
| 330 to 360 degrees | 0.003 | 0.006 | 0.005 | 0.004 | 0.004 | 0.007 |
| Max. value of differences | 0.010 | | 0.005 | | 0.012 | |

TABLE 4

|  | Max. value of differences in radii of curvature (mm) | Variation in shape evaluation value (μm) |
|---|---|---|
| Work. Ex. 1 | 0.010 | 0.10 |
| Work. Ex. 7 | 0.005 | 0.07 |
| Work. Ex 8 | 0.012 | 0.16 |

Next, samples (working examples 9 to 11) were produced by performing edge surface grinding under the production conditions of the working example 1 except that a resin bond grindstone having a different grindstone hardness was used. It should be noted that the lower the grindstone hardness is, the smaller the cylindricity is. The cylindricity was calculated as shown in FIGS. 4 and 5. That is, outlines were obtained at the central position of the side wall surface in the substrate thickness direction and the positions spaced apart upward and downward by 100 μm from the central position, the radii of inscribed circles of the three outlines were derived, the difference between the maximum value and the minimum value of the radii of the inscribed circles of the three outlines was derived, and the radius difference was used as the cylindricity of the side wall surface. All measurements were performed using a roundness/cylindrical shape measurement device.

A magnetic layer and the like were formed on the magnetic-disk glass substrates of the working examples 9 to 11, and magnetic disks were produced. Each of the magnetic disks was incorporated in a 2.5-inch type HDD having a disk rotation rate of 7200 rpm together with a DFH head, and after magnetic signals were recorded at a track density of 500 kTPI, servo signal reading testing was performed in a region of a radius position of 30.4 mm to a radius position of 31.4 mm.

[Evaluation Criterion]

The number of servo signal reading errors in the HDD was evaluated. Table 5 shows the results. The magnetic disks in which the error count is 30 or less are acceptable for practical purposes.

TABLE 5

|  | Cylindricity (µm) | Error count |
|---|---|---|
| Work. Ex. 9 | 6 | 25 |
| Work. Ex. 10 | 5 | 15 |
| Work. Ex 11 | 3 | 12 |

It was confirmed from the evaluation results in Table 5 that although the comparative example 9 was acceptable for practical purposes, there were a larger number of servo signal reading errors in the case where the cylindricity exceeded 5 µm (working example 9) compared to the case where the cylindricity was 5 µm or less (working examples 10 and 11).

Next, the above-described processing conditions were changed as appropriate to produce two types of glass substrate having a substrate thickness of 0.5 mm (the length of the side wall surface on the outer circumferential side was 0.3 mm) (comparative example 1A and working example 1A, respectively). The working example 1A and the comparative example 1A were produced such that the roundness and shape evaluation value of the working example 1A and the comparative example 1A were the same as those of the working example 1 and the comparative example 1. When flutter was evaluated for these examples and improvement widths resulting from a reduction in the shape evaluation value were compared, the improvement width from the comparative example 1A to the working example 1A was greater than the improvement width from the comparative example 1 to the working example 1. Therefore, it was confirmed that the present invention had a better effect on a thin glass substrate having a substrate thickness of 0.5 mm or less, in particular.

While the magnetic-disk glass substrate according to the present invention has been described in detail, the present invention is not limited to the above-described embodiment, and it will be appreciated that various improvements and modifications can be made without departing from the gist of the present invention.

The invention claimed is:

1. A magnetic-disk glass substrate having a circular hole at a center, the magnetic-disk glass substrate comprising:
   a pair of main surfaces; and
   an edge surface, the edge surface having a side wall surface and chamfered surfaces interposed between the side wall surface and the main surfaces,
   a substrate thickness of the magnetic-disk glass substrate being 0.635 mm or less,
   a roundness of the edge surface on an outer circumferential side being 1.5 µm or less, and
   when outlines in a circumferential direction are respectively obtained at two positions spaced apart by 200 µm in a substrate thickness direction on the side wall surface on the outer circumferential side, and a midpoint between centers of two least square circles respectively derived from the outlines is given as a midpoint A, and
   when outlines in the circumferential direction are respectively obtained at positions that are located at centers of the two chamfered surfaces on the outer circumferential side in the substrate thickness direction, and among centers of least square circles derived from the outlines, a center derived from one chamfered surface is given as a center B, and a center derived from the other chamfered surface is given as a center C,
   a sum of a distance between the midpoint A and the center B and a distance between the midpoint A and the center C is 1 µm or less.

2. The magnetic-disk glass substrate according to claim 1, wherein
   the sum is 0.5 µm or less.

3. The magnetic-disk glass substrate according to claim 1, wherein
   in a case where, with regard to a surface roughness of the side wall surface on the outer circumferential side, a maximum height in the substrate thickness direction is Rz(t) and a maximum height in the circumferential direction is Rz(c), Rz(t)/Rz(c) is 1.2 or less.

4. The magnetic-disk glass substrate according to claim 1, wherein
   when a measurement point is provided every 30 degrees in the circumferential direction, referenced on the center of the magnetic-disk glass substrate, and a radius of curvature of a shape of a portion between the side wall surface and the chamfered surface on the outer circumferential side at the measurement point is derived, a difference in the radius of curvature between adjacent measurement points is 0.01 mm or less.

5. The magnetic-disk glass substrate according to claim 1, wherein
   outlines of the side wall surface in the circumferential direction are respectively obtained at a plurality of different positions in the substrate thickness direction, the different positions include at least three positions spaced apart by 100 µm in the substrate thickness direction on the side wall surface on the outer circumferential side, an inscribed circle and a circumscribed circle of each outline are obtained, and a difference in the radius between a smallest inscribed circle and a largest circumscribed circle is 5 µm or less.

6. The magnetic-disk glass substrate according to claim 1, wherein
   the substrate thickness of the magnetic-disk glass substrate is 0.5 mm or less.

7. A magnetic disk in which at least a magnetic layer is formed on a main surface of the magnetic-disk glass substrate according to claim 1.

8. The magnetic-disk glass substrate according to claim 2, wherein
   in a case where, with regard to a surface roughness of the side wall surface on the outer circumferential side, a maximum height in the substrate thickness direction is Rz(t) and a maximum height in the circumferential direction is Rz(c), Rz(t)/Rz(c) is 1.2 or less.

9. The magnetic-disk glass substrate according to claim 2, wherein
when a measurement point is provided every 30 degrees in the circumferential direction, referenced on the center of the magnetic-disk glass substrate, and a radius of curvature of a shape of a portion between the side wall surface and the chamfered surface on the outer circumferential side at the measurement point is derived, a difference in the radius of curvature between adjacent measurement points is 0.01 mm or less.

10. The magnetic-disk glass substrate according to claim 3, wherein
when a measurement point is provided every 30 degrees in the circumferential direction, referenced on the center of the magnetic-disk glass substrate, and a radius of curvature of a shape of a portion between the side wall surface and the chamfered surface on the outer circumferential side at the measurement point is derived, a difference in the radius of curvature between adjacent measurement points is 0.01 mm or less.

11. The magnetic-disk glass substrate according to claim 2, wherein
outlines of the side wall surface in the circumferential direction are respectively obtained at a plurality of different positions in the substrate thickness direction, the different positions include at least three positions spaced apart by 100 µm in the substrate thickness direction on the side wall surface on the outer circumferential side, an inscribed circle and a circumscribed circle of each outline are obtained, and a difference in the radius between a smallest inscribed circle and a largest circumscribed circle is 5 µm or less.

12. The magnetic-disk glass substrate according to claim 3, wherein
outlines of the side wall surface in the circumferential direction are respectively obtained at a plurality of different positions in the substrate thickness direction, the different positions include at least three positions spaced apart by 100 µm in the substrate thickness direction on the side wall surface on the outer circumferential side, an inscribed circle and a circumscribed circle of each outline are obtained, and a difference in the radius between a smallest inscribed circle and a largest circumscribed circle is 5 µm or less.

13. The magnetic-disk glass substrate according to claim 4, wherein
outlines of the side wall surface in the circumferential direction are respectively obtained at a plurality of different positions in the substrate thickness direction, the different positions include at least three positions spaced apart by 100 µm in the substrate thickness direction on the side wall surface on the outer circumferential side, an inscribed circle and a circumscribed circle of each outline are obtained, and a difference in the radius between a smallest inscribed circle and a largest circumscribed circle is 5 µm or less.

14. The magnetic-disk glass substrate according to claim 2, wherein
the substrate thickness of the magnetic-disk glass substrate is 0.5 mm or less.

15. The magnetic-disk glass substrate according to claim 3, wherein
the substrate thickness of the magnetic-disk glass substrate is 0.5 mm or less.

16. The magnetic-disk glass substrate according to claim 4, wherein
the substrate thickness of the magnetic-disk glass substrate is 0.5 mm or less.

17. The magnetic-disk glass substrate according to claim 5, wherein
the substrate thickness of the magnetic-disk glass substrate is 0.5 mm or less.

18. A magnetic disk in which at least a magnetic layer is formed on a main surface of the magnetic-disk glass substrate according to claim 2.

19. A magnetic disk in which at least a magnetic layer is formed on a main surface of the magnetic-disk glass substrate according to claim 3.

20. A magnetic disk in which at least a magnetic layer is formed on a main surface of the magnetic-disk glass substrate according to claim 4.

* * * * *